US012325511B2

(12) United States Patent
Attivi et al.

(10) Patent No.: US 12,325,511 B2
(45) Date of Patent: Jun. 10, 2025

(54) LANDING GEAR ACTUATING DEVICE WITH DOUBLE-STAR MOTOR

(71) Applicant: SAFRAN LANDING SYSTEMS, Velizy-Villacoublay (FR)

(72) Inventors: Foly Selom Marius Attivi, Moissy-Cramayel (FR); François-Noel Leynaert, Moissy-Cramayel (FR); Steve Coustenoble, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 107 days.

(21) Appl. No.: 18/025,564

(22) PCT Filed: Sep. 9, 2021

(86) PCT No.: PCT/EP2021/074863
§ 371 (c)(1),
(2) Date: Mar. 9, 2023

(87) PCT Pub. No.: WO2022/053583
PCT Pub. Date: Mar. 17, 2022

(65) Prior Publication Data
US 2023/0331375 A1     Oct. 19, 2023

(30) Foreign Application Priority Data
Sep. 10, 2020 (FR) ........................ 2009185

(51) Int. Cl.
*B64C 25/26*     (2006.01)
*B64C 25/24*     (2006.01)

(52) U.S. Cl.
CPC .............. *B64C 25/26* (2013.01); *B64C 25/24* (2013.01)

(58) Field of Classification Search
CPC ................................ B64C 25/26; B64C 25/24
See application file for complete search history.

(56) References Cited

U.S. PATENT DOCUMENTS 2,375,422 A     5/1945 Leland
2018/0208299 A1*    7/2018 Hinderhofer ........... B64C 25/22
(Continued)

FOREIGN PATENT DOCUMENTS

GB           465882 A      5/1937

OTHER PUBLICATIONS

International Search Report for PCT/EP2021/074863 dated Dec. 1, 2021.

*Primary Examiner* — Justin M Benedik
(74) *Attorney, Agent, or Firm* — Sughrue Mion, PLLC

(57) ABSTRACT

A device for actuating an aircraft undercarriage leg includes an electronic controller and an actuator. The actuator includes a three-phase electric motor connected to the electronic controller. The device is arranged to authorize gravity deployment of the aircraft undercarriage leg. The motor includes a stator having at least first and second star-coupled three-phase windings. The electronic controller includes a first control channel connected to the first three-phase winding, and a second control channel connected to the second three-phase winding. Each of the control channels includes a controller that generates a high-level control instruction, a driver that generates a low-level driver instruction from the high-level control instruction, and a braking circuit that brakes the motor during the gravity deployment of the leg by using energy produced by the motor. The device is arranged to use the control channels as a function of the availabilities of the components of each channel.

13 Claims, 3 Drawing Sheets

(56) References Cited

U.S. PATENT DOCUMENTS

2020/0056686 A1 2/2020 Veilleux, Jr. et al.
2020/0189726 A1* 6/2020 Fortier .................. F16C 41/004

* cited by examiner

LANDING GEAR ACTUATING DEVICE WITH DOUBLE-STAR MOTOR

CROSS REFERENCE TO RELATED APPLICATIONS

This application is a National Stage of International Application No. PCT/EP2021/074863 filed Sep. 9, 2021, claiming priority based on French Patent Application No. 2009185 filed Sep. 10, 2020, the contents of each of which being herein incorporated by reference in their entireties.

The present invention relates to the field of aviation, and more particularly to aircraft undercarriages.

BACKGROUND OF THE INVENTION

An undercarriage generally comprises a leg having one end connected by a hinge to a structure of the aircraft and a bottom end provided with an axle carrying at least one wheel. The hinge enables the leg to pivot between an extended position in which the deployed leg can support the aircraft during stages of landing, taking off, and taxiing, and a retracted position in which the leg is retracted into the landing gear compartment during stages of flight.

The leg is moved between its two positions by means of an actuator. The actuator for moving the leg forms part of an actuator device that also includes an actuator for locking and unlocking the leg in each of its positions, and an actuator for the door that closes the landing gear compartment. Hydraulic actuators, as have conventionally been used in the past, are now being replaced by actuators that are electrohydraulic or electromechanical. The actuator device includes a control unit that is connected to the actuators in order to control them in synchronized manner, and it is conventionally arranged also to allow the leg to be deployed by gravity, i.e. to allow the leg to be moved from its retracted position to its extended position by its own weight.

For an actuator having an electric motor, a braking circuit is provided for slowing down the movement of the leg while it is being deployed by gravity so as to ensure that the leg does not come violently into abutment in its extended position. The braking circuit makes use of the energy generated by the electric motor, which has its rotor driven in rotation by the leg as it moves towards its extended position under its own weight. For this purpose, the braking circuit has either a battery that is recharged by the energy produced by the motor, or else one or more resistors.

Clearly devices for actuating undercarriages must operate reliably in order to guarantee the safety of the passengers in the aircraft to which they are fitted. This reliability constraint is in addition to the constraints relating to the weight and the size of the undercarriage, which must be as small as possible.

OBJECT OF THE INVENTION

A particular object of the invention is to provide an undercarriage actuator device that satisfies the above-mentioned constraints, at least in part.

SUMMARY OF THE INVENTION

To this end, the invention provides a device for actuating an aircraft undercarriage leg, the device comprising an electronic controller and an actuator comprising a electric motor connected to the electronic controller, the device also being arranged to authorize gravity deployment of the leg. The motor includes a stator having at least first and second star-coupled three-phase windings. The electronic controller comprises a first control channel connected to the first three-phase winding, and a second control channel connected to the second three-phase winding. Each control channel comprises a control unit for generating a high-level control instruction, a driver unit for generating a low-level driver instruction from the high-level control instruction, and at least one braking circuit for braking the motor during gravity deployment of the leg by making use of energy produced by the motor. The device is arranged to use the control channels as a function of the availabilities of the components of each channel and of the looked-for performance.

Thus, actuation is performed by a single three-phase motor with two star-coupled windings, each connected to a respective control channel making it possible both to control movement of the leg and also to brake the leg during gravity deployment. A component that is available is a component that has not failed, i.e. a component that is capable of performing its function with the intended performance. A failure of a component in one of the control channels or a failure of one of the windings thus does not prevent the undercarriage from operating. The invention is thus of a structure that is compact, but nevertheless redundant in that it enables the device to be reconfigured in the event of one of the components failing.

According to a first particular characteristic, at least one of the driver units is arranged to manage gravity deployment.

The driver units make use of loops that are relatively fast, enabling reaction time to be relatively short while implementing gravity deployment.

According to a second particular characteristic, each control channel includes a plurality of braking circuits that can be activated selectively as a function of the energy produced by the motor during gravity deployment of the leg. The braking circuits are selected as a function:

1) of the energy produced depending on the position of the undercarriage; and
2) of the states of the driver channels, of the control channels, and of the double-star motor.

The torque and speed profiles as a function of the position of the undercarriage may differ for each driver channel.

It is thus possible to have a plurality of levels of braking as a function of which braking circuit(s) is/are activated.

Other characteristics and advantages of the invention appear on reading the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
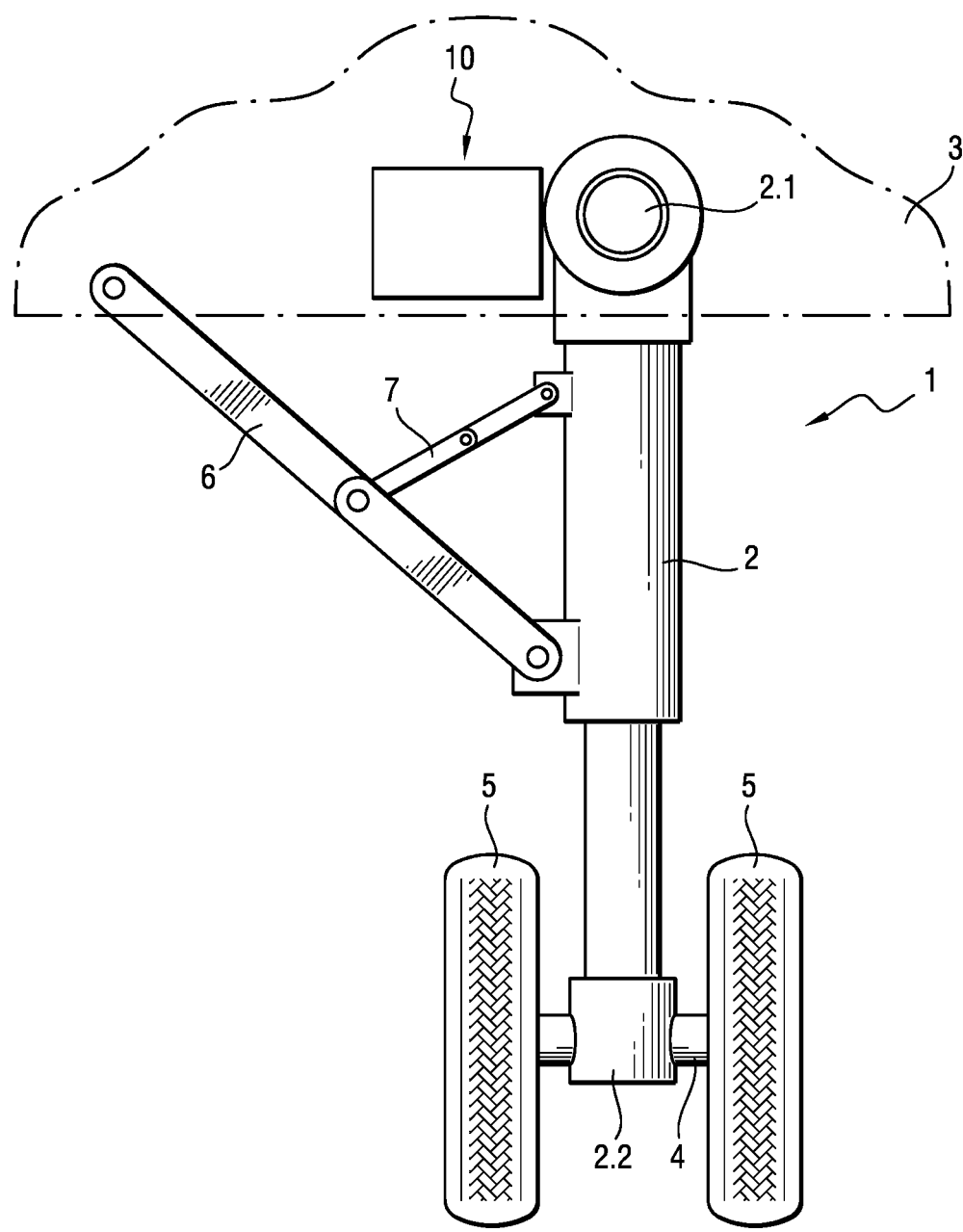
FIG. 1 is a diagrammatic view of an undercarriage of the invention.

With reference to FIG. 1, the undercarriage of the invention is given overall reference 1 and comprises a leg 2 having one end 2.1 for connection by a hinge to the structure 3 of an aircraft, and an opposite end 2.2 provided with an axle 4, which in this example carries a pair of wheels 5. The leg 2 is movable between an extended position (as shown in figure) and a retracted position, and it is stabilized in its extended position by a main brace 6 that is held in alignment by a locking stay 7. Since the mechanical structure of the undercarriage 1 is conventional, it is not described in greater detail herein, particularly since the invention is applicable to retractable undercarriages of all kinds.

The undercarriage 1 also comprises an actuator device 10 that is arranged to move the leg 2 between its retracted position and its extended position, and also to allow the leg 2 to move under gravity from its retracted position to its extended position, in the event of the actuator device failing.

Figure 2:
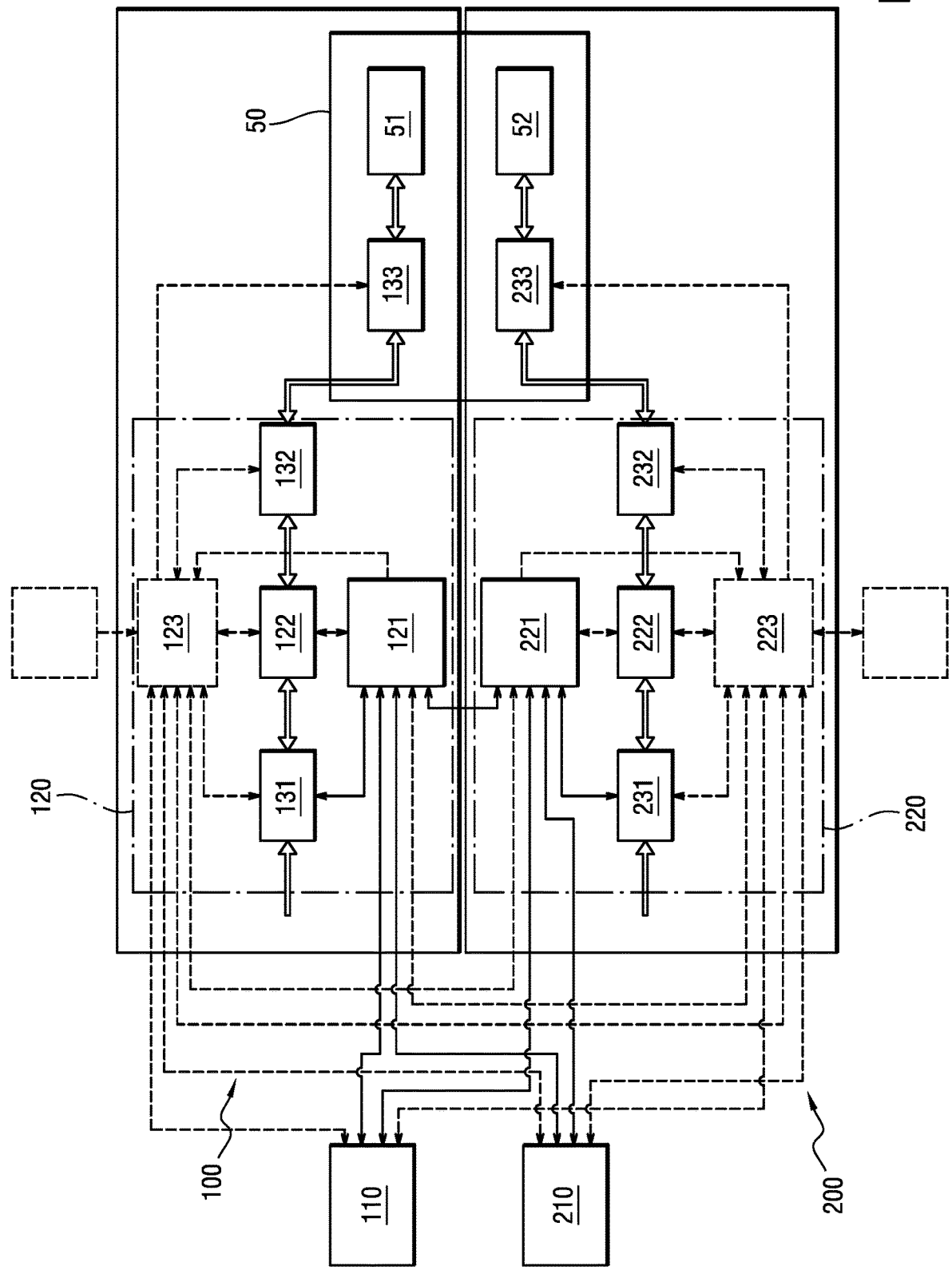
FIG. 2 is a block diagram showing the architecture of the actuator device of the invention in a maximum configuration.

The actuator device 10, as shown in FIG. 2 with a large number of options, comprises a controller and an actuator for moving the leg 2.

The actuator for moving the leg comprises an electric motor 50 of the double-star type. More precisely, the electric motor 50 is of the synchronous type, and it comprises a rotor that is surrounded by a stator comprising both a first star-coupled three-phase winding 51 and a second star-coupled three-phase winding 52. Each three-phase winding 51, 52 is associated with a respective rotor position sensor.

The controller comprises both a first control channel connected to the first three-phase winding 51 and given overall reference 100, and also a second control channel connected to the second three-phase winding 52 and given overall reference 200.

Each of the control channels 100 and 200 comprises:
an electronic control unit 110 or 210 for generating a high-level control instruction (and commonly referred to as a system unit);
an electronic driver unit 120 or 220 for generating a low-level control instruction (and commonly referred to as a subsystem unit); and
three braking circuits 131, 132, & 133, or 231, 232, & 233 for braking the electric motor 50 during gravity deployment of the leg 2 by making use of energy produced by the electric motor 50.

Each electronic control unit 110, 210 comprises computer calculation means for connection to a cockpit of the aircraft that sends it a command to deploy the leg 2 (to move the leg 2 to its extended position) or a command to retract the leg 2 (to move the leg 2 towards its retracted position). Each electronic control unit 110, 210 is arranged to generate a high-level command (or "setpoint") corresponding to the deploy or retract instruction it has received, and it implements a slow feedback loop in order to adapt the high-level command, e.g. as a function of the position of the leg 2.

Each driver electronic unit 120, 220 comprises a control circuit 121, 221 and a power circuit 122, 222 in the form of an inverter that is controlled by the control circuit 121, 221 in order to power the motor 50. Each control circuit 121, 221 comprises calculation means connected to the electronic control unit 110, 210 that is arranged to generate a low-level command as a function of the high-level command that has been transmitted thereto by the electronic control unit 110, 210. The low-level command is a driver signal for the power circuit 122, 222, and the control circuit 121, 221 implements a fast feedback loop to adapt the driver signal, e.g. as a function of electrical parameters (voltage, current) of the three-phase winding 51, 52 or as a function of the speed of the rotor.

The electronic driver unit 120, 220 also comprises a monitoring unit 123, 223 that comprises calculation means connected to sensors that collect operating parameters of the various components of the undercarriage.

The control circuit 121 (or respectively 221) is arranged to execute the following functions:
control the inverter of the power circuit 122 (or respectively 222), and thus control the winding 51 (or respectively 52) of the double-star electric motor 50; and
drive the braking circuits 131, 132, 133 (or respectively 231, 232, 233).

The monitoring unit 123 (or respectively 223) is arranged to monitor the drive unit 120 (or respectively 220), the electric motor 50, the control channel 100 (or respectively 200), and the control unit 110 (or respectively 210).

In this example, the first braking circuit 131, 231 is shown as being interposed between the high-voltage network of the aircraft and the power circuit 122, 222. In this example, the second braking circuit 132, 232 and the third braking circuit 133, 233 are arranged in series between the power circuit 122, 222 and the motor 50. More precisely, the third braking circuit 133, 233 is offset onto the motor 50. The braking circuits may all be of the same type, or they may be of different types; they may all have the same braking capacity, or they may have different braking capacities. For example, the braking circuits 131, 132, 231, and 232 include respective rechargeable batteries for recovering the energy produced by the electric motor 50 during gravity deployment, or they include resistors for dissipating the energy produced by the electric motor 50 during gravity deployment. In this example, the braking circuits 133, 233 are made up of power components located on thermally conductive portions of the motor in order to use those portions as a radiator for thermally dissipating the energy produced by the electric motor 50 during gravity deployment. By way of example, each braking circuit is connected to the control channel via switches that enable the braking circuit in question to be short-circuited in order to activate or deactivate said braking circuit. In this example, the switches are driven by the electronic control unit 110, 210.

More precisely:
the first braking circuit 131 (or respectively 231) is located between the high-voltage direct current (DC) bus and the inverter of the power circuit 122 (or respectively 222). Physically, the first braking circuit may be situated inside the driver unit 120 (or respectively 220), or on the outside, in the immediate proximity thereof;
the second braking circuit 132 (or respectively 232) is placed between the inverter of the power circuit 122 (or respectively 222) and the first winding 51 (or respectively the second winding 52) of the double-star motor 50. Physically, the second braking circuit may be situated inside the driver unit 120 (or respectively 220), or on the outside, in the immediate proximity thereof; and
the third braking circuit 133 (or respectively 233) is placed between the power harness of the first winding 51 and the first winding 51 (or respectively between the power harness of the second winding 52 and the second winding 52). Physically, these braking circuits may be situated inside the first winding 51, or the second winding 52, or the double-star motor 50 as a whole, or on the outside, in the immediate proximity thereof.

The braking circuits are driven by the electronic control units 110, 210, via the switches.
a) The switches are driven:
either directly by the monitoring unit 123 or the control unit 121 (or respectively 223, 221); and or else the braking circuits 131, 132, 133 (or respectively 231, 232, 233) containing electronic devices enabling them to monitor variation of currents and/or voltages that are images of the variation in the torque and/or the speed of the undercarriage, thus serving to engage said switches independently.

b) The electronic control unit 110, 210 is arranged to decide independently to activate the function of the braking circuit by sending the corresponding command to the electronic driver unit 120, 220, which then takes charge of driving the appropriate braking circuit as a function of the states of the control electronics, of the harnesses, and of the double-star motor. It should be observed that the system is arranged such a manner that a braking circuit command has priority over a motor command.

It should be observed that all of the components of the control channels 100, 200 are themselves known, such that their structures and their modes of operation are not described in detail herein.

The device is arranged to use the control channels 100, 200 as a function of the availabilities of the components in each of the control channels 100, 200.

For example:
  in the event of a failure of the first winding 51, braking may be provided by activating the braking circuit 231, or the braking circuit 232, or both braking circuits 231 and 232 (in a variant, it is also possible to involve the braking circuit 233);
  in the event of a failure of the first control channel 100 or of the electrical harness of the first winding of the motor 50, braking may be provided by activating the braking circuit 231, or the braking circuit 232, or both braking circuits 231 and 232, or the braking circuit 133 (in a variant, it is also possible to involve the braking circuit 233);
  in the event of a failure of the rotor position sensor or of any of the components 121, 122, 123, 131 of the electronic driver unit 120, braking may be provided by activating the braking circuit 132, or the braking circuit 133, or both braking circuits 132 and 133, or the braking circuit 231, or the braking circuit 232, or both braking circuits 231 and 232 (in a variant, it is also possible to involve the braking circuit 233);
  in the event of a failure of the second winding 52, braking may be provided by activating the braking circuit 131, or the braking circuit 132, or both braking circuits 131 and 132 (in a variant, it is also possible to involve the braking circuit 133);
  in the event of a failure of the connection between the second control channel 200 and the motor 50, braking may be provided by activating the braking circuit 131, or the braking circuit 132, or both braking circuits 131 and 132, or the braking circuit 233 (in a variant, it is also possible to involve the braking circuit 133); and
  in the event of a failure of the rotor position sensor or of any of the components 221, 222, 223, and 231 of the electronic driver unit 220, braking may be provided by activating the braking circuit 232, or the braking circuit 233, or both braking circuits 232 and 233, or the braking circuit 131, or the braking circuit 132, or both braking circuits 131 and 132 (in a variant, it is also possible to involve the braking circuit 133).

The device is also arranged to make use of the control channels 100, 200 as a function of the looked-for performance, in particular in terms of braking. In this example, the electronic control unit 110, 210 is arranged to activate the braking circuits as a function of the speed of rotation and of the torque of the motor. Specifically, it can be understood that activating a greater number of braking circuits increases the braking of the rotor.

The controller includes interconnections between the control channels 100 and 200. It is thus possible to connect some or all of the components of the control channel 100 with components of the control channel 200.

In this example, the driver units 120 and 220 are connected together to exchange active/passive status information.

It can be understood that the invention admits numerous variants.

For example, it is possible to use only one sensor serving to detect one of the two positions of the leg 2 or to detect the travel speed of the leg 2 between its two positions (referred to below as the "system sensor"). The system sensor may be connected either to one or both of the control units 110 and 210, or to one or both of the driver units 120 and 220, or directly to the motor 50. Under such circumstances, the system sensor, which is situated on the undercarriage, sends undercarriage position and/or speed information directly to the braking circuit 133 or 233. These braking circuits apply conditions (implemented in hardware or in software) for activating the switches of the braking circuits 133 or 233 as a function of the system sensor status or information.

Thus, in combination with the sole system sensor, use is made of the output from the rotor position sensor that is used for counting the revolutions of the rotor by monitoring the power supply current and voltage of the motor 50. This solution is advantageous since it saves on a sensor, while nevertheless making it possible to manage the position abutments of the undercarriage leg. Communication between the two driver units 120 and 220 serves to impart redundancy to the motor current and position information. In the event of a loss of power supply, it should be observed that it remains possible to know the position of the rotor of the motor 50. Specifically, the high-voltage power supplies of the electronic driver units 120 and 220 are preferably segregated and independent, enabling the information about the position of the rotor to be conserved in the event of either one of those power supplies being lost. Also preferably, the high-voltage power supply of the first control channel 100 is of a structure different from the high-voltage power supply of the second control channel 200.

In a variant, it is possible to use two system sensors, each capable of detecting both positions of the leg 2. One of the systems sensors is connected to the control channel 100 and the other system sensor is connected to the control channel 200: the system sensors may be connected to the control units or to the driver units; or, by way of example, the first system sensor may be connected to the control unit 110 while the second system sensor is connected to the driver unit 220; or they may be connected in any other configuration. It is then no longer necessary to count the number of revolutions of the rotor within each electronic driver unit 120, 220, nor is it necessary to monitor the electrical parameters of the motor 50. The advantage is that it is possible to know the position of the rotor, even in the event of a loss of power supply.

In the same manner, it is possible to choose to have one or more braking circuits for each control channel 100, 200, and/or to have or to omit braking circuits offset into the motor 50.

Having braking circuits offset into the motor makes it possible for the braking circuits in the driver unit to be of smaller dimensions. The braking circuit in the motor makes use of the capacity of the motor to absorb heat. The drawback of this solution is that it requires sufficient space for receiving power electronics to be available in the vicinity of the motor.

In other variants, it is possible to have a connection between the electronic driver units 120 and 220 in order to improve the availability of the overall braking function. There is no hard separation between the two driver units and no real independence of the two driver units. More precautions therefore need to be taken to ensure that both driver units are not simultaneously active when controlling the motor 50. In contrast, both driver units can be active simultaneously in order to manage braking.

If no communication is provided between the two driver units, hard segregation and strong independence exists between the two driver units.

Concerning control strategies, it can be understood that:
- each control unit may have an active state in which it controls the driver unit powering the motor and a passive state in which it is the other control unit that controls the driver unit powering the motor;
- each control unit may have an active state in which it powers the motor and a passive state in which it is the other control unit that powers the motor; and
- each winding may have an activated state in which it is powered and a deactivated state in which it is not powered).

In control mode, the system may present the following states:

retract in an emergency mode, the second control unit 210 being arranged to determine the speed of desired for the movement of the leg 2 during retraction and to generate a corresponding control signal;

a first driver unit 120 that determines the power supply parameters for the first winding 51 of the motor 50 as a function of the control signal received from the first control unit 110 and as a function of the signal coming from a first sensor 61;

a second driver unit 220 that determines the power supply parameters for the second winding 52 of the motor 50 as a function of the control signal received from the second control unit 210 and as a function of the signal coming from a second sensor 62;

the first sensor 61 is a position sensor for sensing the position of the leg 2 and it is connected to the first driver unit 120; and the second sensor 62 is a position sensor for sensing the position of the leg 2 and it is connected to the second driver unit 220.

The first control unit 110 is connected to the first driver unit 120 to transmit the speed control signal thereto and to the second driver unit 220 to transmit thereto an instruction for putting control of the motor into a passive state.

The second control unit 210 is connected to the second driver unit 220 to transmit the speed control signal thereto and to the first driver unit 120 to transmit thereto an instruction for putting control of the motor into a passive state.

TABLE 1

| Possible strategies | SYSTEM_1 | SYSTEM_2 | SUB-SYSTEM 1 | SUB-SYSTEM 2 | Winding 1 | Winding 2 |
|---|---|---|---|---|---|---|
| Strategy 1 | Passive | Passive | Passive | Passive | Deactivated | Deactivated |
| Strategy 2 | Active | Passive | Passive | Passive | Deactivated | Deactivated |
| Strategy 3 | Active | Passive | Active | Passive | Activated | Deactivated (a) Or Activated (b) |
| Strategy 4 | Active | Passive | Active | Active | Activated | Activated |
| Strategy 6 | Active | Passive | Passive | Active | Deactivated (a) Or Activated (b) | Activated |
| Strategy 7 | Passive | Active | Passive | Passive | Deactivated | Deactivated |
| Strategy 8 | Passive | Active | Active | Passive | Activated | Deactivated (a) Or Activated (b) |
| Strategy 9 | Passive | Active | Active | Active | Activated | Activated |

Concerning the braking, it can be understood that since each control channel has three braking circuits, each of which can have two states (activated, deactivated), there are 64 possible states for the system in braking mode depending on whether use is made of one, two, three, four, five, or six braking circuits.

Figure 3:
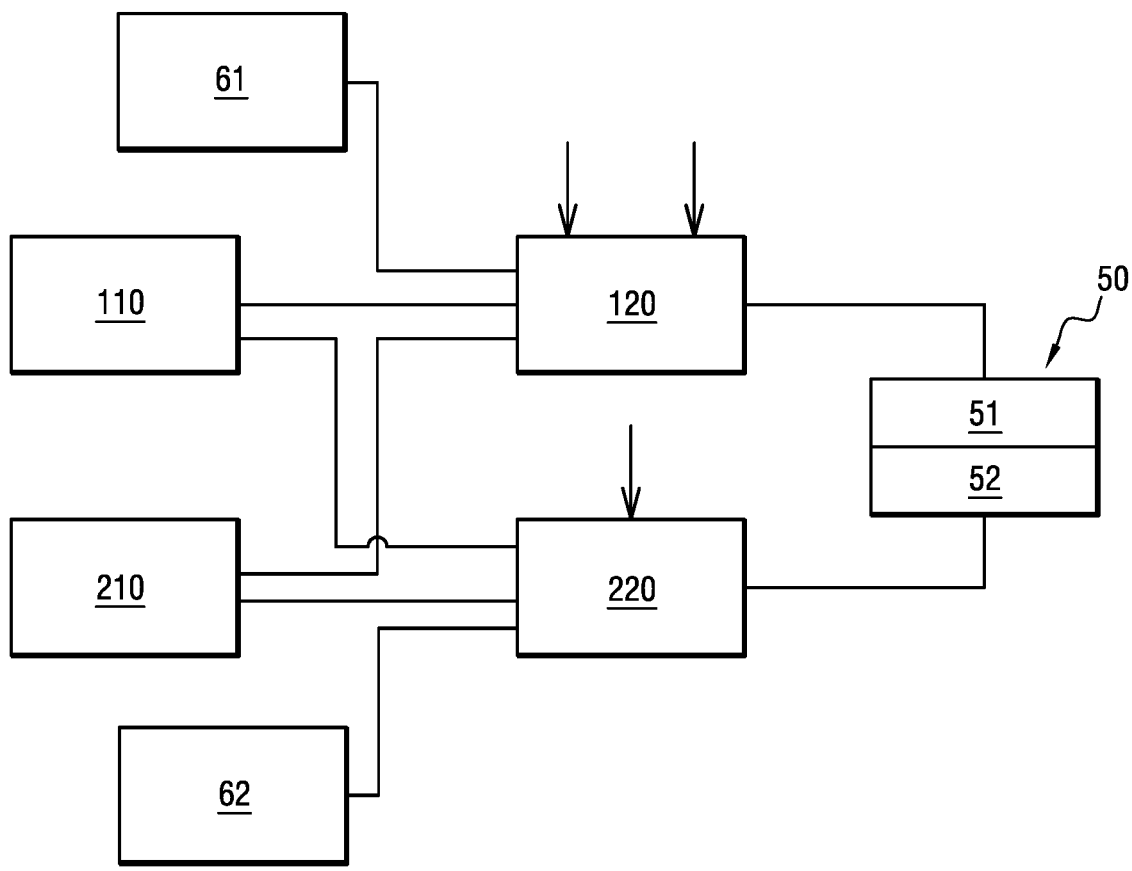
FIG. 3 is a block diagram of a device in a particular embodiment of the invention.

FIG. 3 shows a particular embodiment of the invention comprising:
- a permanent magnet synchronous motor 50 including, as above, both a first star-coupled three-phase winding 51 and a second star-coupled three-phase winding 52, and also incorporating both a first rotor position sensor associated with the first winding 51 and a second rotor position sensor associated with the second winding 52;
- a first control unit 110 that determines the speed desired for movement of the leg 2 and that generates a corresponding control signal for controlling deployment or retraction of the leg 2 in normal mode;
- a second control unit 210 having a handle that enables the pilot to issue only a command for causing the leg 2 to Concerning braking:
the driver unit 110 (or respectively 210) is in charge of sending a braking command to the control unit 120 (or respectively 220) after consolidation of the high-level state of the overall undercarriage system.

This high-level state takes account of the following variables:
- statuses of the driver units;
- statuses of the control units;
- statuses of the undercarriage; and
- statuses/commands of the high-level systems such as commands coming from the aircraft instrument panel.

The control unit 120 (or respectively 220) is in charge of selecting and controlling the braking circuits in the first control channel 100 (or respectively in the second control channel 200).

This selection is performed after consolidating:
- braking commands coming from the equipment 110, 100 (or respectively 210, 200);
- the status of the control unit 120 (or respectively 220);

the status and/or information coming from the system sensors for use by the control unit 120 (or respectively 220); and the status of the equipment comprising the first winding 51, the third braking circuit 133, and the harness of the first winding 51 (or respectively the equipment comprising the second winding 52, the third braking circuit 233, and the harness of the second winding 52).

Since the control unit 120 (or respectively 220) is provided with these elements, with a truth table specific thereto, and with its control relationship, it is in a position to control the various braking circuits.

The control unit 120 (or respectively 220) is arranged:

to select and control directly and independently the braking circuits of the first control channel (or respectively of the second control channel); and to control indirectly and independently, or otherwise, the braking circuits in the second control channel (or respectively the first control channel).

Naturally, the invention is not limited to the embodiments and variants described, but covers any variant coming within the ambit of the invention as defined by the claims.

In particular, the structure of the device may be different from that described.

The control unit and the control portion of the driver unit may be physically distinct, or they may be grouped together in a common entity executing both a program having a portion that implements a slow feedback loop and also a portion that implements a fast feedback loop.

Each electronic driver unit may comprise calculation means in one or more entities, e.g. one providing control and another providing monitoring in order to segregate these two functions. By way of example, each calculation means may comprise a processor, a microcontroller, an integrated circuit of application-specific integrated circuit (ASIC) type, a field programmable gate array (FPGA), . . . .

The device may have more than two control channels.

It can be understood that the motor with two star-coupled windings is equivalent to a set of two motors sharing a common rotor. The invention is applicable to sets of more than two motors.

The invention claimed is:

1. A device for actuating an aircraft undercarriage leg, the device comprising:
   an electronic controller; and
   an actuator comprising a three-phase electric motor connected to the electronic controller, wherein the device is arranged to authorize a gravity deployment of the aircraft undercarriage leg,
   wherein the motor includes a stator having at least first and second star-coupled three-phase windings,
   wherein the electronic controller comprises a first control channel connected to the first three-phase winding, and a second control channel connected to the second three-phase winding,
   wherein each of the first and second control channels comprises a controller that generates a high-level control instruction, a driver that generates a low-level driver instruction from the high-level control instruction, and at least one braking circuit that brakes the motor during the gravity deployment of the aircraft undercarriage leg by using energy produced by the motor, and
   wherein the device is arranged to use the first and second control channels as a function of the availabilities of the components of each control channel.

2. The device according to claim 1, wherein at least one of the drivers is arranged to control the gravity deployment.

3. The device according to claim 1, wherein each of the first and second control channels includes a plurality of braking circuits that can be activated selectively as a function of the energy produced by the motor during the gravity deployment of the aircraft undercarriage leg.

4. The device according to claim 2, wherein the driver of each of the first and second control channels is arranged to select one or more of the braking circuits to be activated.

5. The device according to claim 2, wherein one of the braking circuits of each of the first and second control channels is offset into the vicinity of the motor.

6. The device according to claim 1, wherein the motor includes at least one sensor that senses the position of its rotor.

7. The device according to claim 1, including at least one sensor that senses the position of the aircraft undercarriage leg, said at least one sensor being connected to at least one of the first and second control channels.

8. The device according to claim 1, including interconnections between the first and second control channels.

9. The device according to claim 7, wherein the drivers are connected together to exchange status information.

10. The device according to claim 1, wherein at least one of the first and second control channels includes a monitoring unit connected to other components of said control channel.

11. The device according to claim 1, wherein the controllers and the drivers can be controlled to occupy an active state or a passive state.

12. An aircraft undercarriage comprising:
   a leg that is hinged to pivot between a retracted position and an extended position; and
   an actuator device that actuates the leg between the retracted position and its extended position, the actuator device comprising:
   an electronic controller; and
   an actuator comprising a three-phase electric motor connected to the electronic controller,
   wherein the device is arranged to authorize gravity deployment of the aircraft undercarriage leg,
   wherein the motor includes a stator having at least first and second star-coupled three- phase windings,
   the electronic controller comprises a first control channel connected to the first three- phase winding, and a second control channel connected to the second three-phase winding,
   wherein each control channel comprises a controller that generates a high-level control instruction, a driver that generates a low-level driver instruction from the high-level control instruction, and at least one braking circuit that brakes the motor during a gravity deployment of the leg by making use of energy produced by the motor, and
   wherein the actuator device is arranged to use the control channels as a function of the availabilities of the components of each channel.

13. An aircraft including an aircraft undercarriage including the device according to claim 1.

* * * * *